United States Patent [19]

Bilow

[11] 4,178,430

[45] Dec. 11, 1979

[54] POLYMERIC SCHIFF'S BASES CONTAINING ACETYLENE TERMINAL GROUPS

[75] Inventor: Norman Bilow, Encino, Calif.

[73] Assignee: Hughes Aircraft Company, Culver City, Calif.

[21] Appl. No.: 962,573

[22] Filed: Nov. 20, 1978

[51] Int. Cl.[2] ........................ C08G 12/08; C08G 12/40

[52] U.S. Cl. .................................... 528/245; 528/244; 528/265; 528/266; 528/269

[58] Field of Search ............... 528/244, 245, 266, 269, 528/265

[56] References Cited

U.S. PATENT DOCUMENTS

| | | | |
|---|---|---|---|
| 3,845,018 | 10/1974 | Bilow et al. | 528/392 |
| 3,879,349 | 4/1975 | Bilow et al. | 528/127 |
| 3,897,395 | 7/1975 | D'Alelio | 526/263 |

*Primary Examiner*—Lucille M. Phynes

*Attorney, Agent, or Firm*—Booker T. Hogan, Jr.; W. H. MacAllister

[57] ABSTRACT

Acetylene-substituted Schiff's bases are prepared by the reaction of either acetylene-substituted amines and dicarboxaldehydes or acetylene-substituted aldehydes and diamines.

These compounds are polymerizable and in some examples they yield conjugated polymers useful in the fabrication of conductors and semiconductors.

6 Claims, No Drawings

POLYMERIC SCHIFF'S BASES CONTAINING ACETYLENE TERMINAL GROUPS

BACKGROUND OF THE INVENTION

1. Field of the Invention

This invention relates generally to the preparation of thermosetting oligomers, some of which cure into polymeric products having conjugated molecular structures. More particularly, the invention relates to the preparation of acetylene-substituted Schiff's bases and the polymeric products derived therefrom.

2. Prior Art

Extensive research has been conducted on the part of Applicant herein and others to develop thermosetting resins or oligomers suitable for use in the preparation of high temperature composites and adhesives. A principal goal of this research has been to develop thermosetting resins or prepolymers which cure through addition reactions to form thermally stable materials with little or no voids.

Examples of this prior art work are shown in the publications of Fred E. Arnold and Robert F. Kovar entitled "Polyphenylquinoxalines With Terminal Acetylene Groups," published (a preprint for the 8th National Society for the Advancement of Materials and Process Engineering technical conference in Seattle, Washington), Oct. 12–14, 1976; P. M. Hergenrather entitled "Crosslinking High Temperature Polymers, Particularly Polyphenylquinoxalines," published as a preprint for the 172nd meeting of the American Chemical Society in San Francisco, California, in August–September of 1976 (Vol. 36, No. 2); and Frederick L. Hedberg et al entitled "Benzil End-Capped Acetylene Terminated Phenylquinoxalines," published in the American Chemical Society Polymer preprints, Vol. 18, No. 1, in March of 1977, and in U.S. Pat. Nos. 3,845,018 and 3,879,349 issued to Norman Bilow et al on Oct. 29, 1974 and Apr. 22, 1975, respectively as well as U.S. Pat. 3,897,395, issued to Gaetano F. D'Alelio.

All of the oligomers described in the above-stated prior art need to be polymerized at temperatures of 200° C. or above, none yield viscous tacky intermediate state polymer melts, and none of them are fully conjugated compounds which can be polymerized into conjugated resins.

Oligomers susceptible to being processed as viscous tacky intermediate state polymers and with the ability to cure at temperatures below 200° C. are desired to facilitate the formation of composites with minimal processing difficulties. Conjugated materials such as these oligomers are desired for use as light weight electrical conductor and/or semiconductor applications.

Applicant knows of no polymeric compounds susceptible to the formation of thermally stable high temperature composites that are easily processed, cure at relatively low temperatures (as low as 150° C.) and function as either conductors or semiconductors.

It is therefore an objective of this invention to provide a new class of homopolymerizable prepolymers which cure without gas evolution.

A second objective of this invention is to provide fully conjugated compounds which can be homopolymerized into completely conjugated polymers.

A third objective of this invention is to provide thermosetting prepolymers which cure at temperatures as low as 150°–160° C.

A fourth objective of this invention is to provide acetylene-substituted prepolymers that can be caused to polymerize into viscous tacky products prior to undergoing complete cures.

SUMMARY OF THE INVENTION

In seeking to achieve the above-stated objectives while avoiding the disadvantages of prior art compounds, a new class of homopolymerizable polymers has been invented. These polymers are the reaction products of either dicarboxaldehydes and acetylene-substituted amines or acetylene-substituted aldehydes and diamines.

Compounds prepared in accordance with this invention are either partially conjugated or fully conjugated and are polymerizable, at relatively low temperatures, into fully conjugated or partially conjugated resins. Some of the compounds are fusible at sufficiently low temperatures to allow them to be converted into tacky viscous syrups, at convenient reaction rates and can be fully cured to a thermosetting resin at temperatures on the order of 160° C.

DETAILED DESCRIPTION OF THE INVENTION

It has been discovered that acetylene-substituted Schiff's bases can be prepared from the reaction of acetylene-substituted amines and dicarboxaldehydes or from the reaction of acetylene-substituted aldehydes and diamines. The molecular structures of these products can be illustrated as follow:

$$H-C\equiv C-Ar-R-Ar-C\equiv CH \qquad (1)$$

where R may be —N=N—Ar'—CH=N—, or —CH=N—Ar'—N=CH— and Ar is phenylene, biphenylene, naphthylene, anthracene, phenanthrene, pyrene, alkyl or aryl substituted phenylene, alkyl or aryl substituted biphenylene, alkyl or aryl substituted naphthylene, and heterocyclic analogues of the above wherein one or more of the aromatic carbon atoms is replaced by a nitrogen or sulphur atom.

The advantages of this invention lie in the fact that acetylene-substituted Schiff's bases can be made very easily, they usually have low melting points prior to cure, they can polymerize through a tacky viscous state, and they can produce partially and fully conjugated polymeric products.

Acetylene-substituted amines suitable for use in preparing the prepolymers of this invention have the formula:

$$HC\equiv C-Ar-NH_2 \qquad (2)$$

where Ar is as defined above. However Ar may also be a compound whose general structure is:

(3)

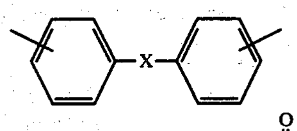

where X is O, S, $CH_2$, $-(CH_2)_{\overline{n}}$, $-C(=O)-$, $-(CF_2)_{\overline{n}}$, $>C(CH_3)_2$, $-SO_2-$ or phenylene.

Aromatic dicarboxaldehydes suitable for use in preparing the prepolymers of this invention have the general formula OHC—Ar'—CHO (4)

where Ar'may be phenylene, diphenylene, terphenylene, naphthalene, anthracene, phenanthrene, or a compound whose structure is $\phi$—X'—$\phi$ wherein $\phi$ is phenylene and X' is O, S, $CH_2$, $-(CH_2)_n$, —CO—, $-(CF_2)_n$, $>C(CH_3)_2$, or —$SO_2$—.

A typical reaction sequence leading to the production of one species of oligomers in accordance with this invention is as follows:

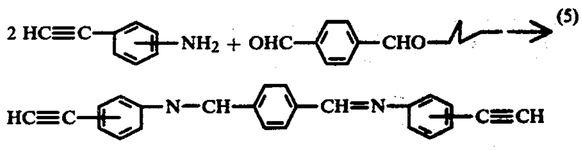
(5)

The preferred compounds of this invention are synthesized from ortho or para substituted amino-phenyl acetylenes which yield fully conjugated oligomers. The term "fully conjugated" is understood to imply that each double or triple bond is attached to a single bond which in turn is attached to another double or triple bond as shown below:

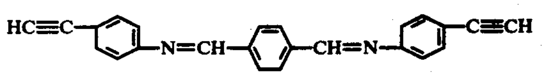
(6)

In a similar manner, conjugated Schiff's bases can be made by the reaction of a diamine with ethynylphenyl ketone or ethynylphenyl aldehyde. Those reactions are illustrated by the following formulas:

(7)
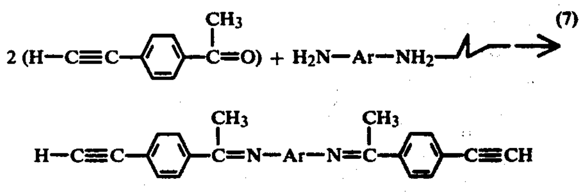

(8)
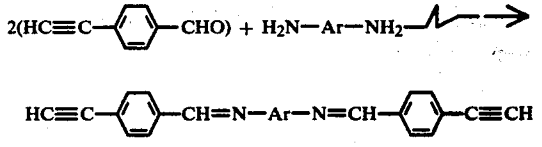

where Ar is as defined above.

Oligomers having structures such as that shown at (6) theoretically are superconductors in themselves. However, there is a significant energy barrier (activation energy) which prevents the transfer of electrons from one molecule to the next. Nevertheless, these molecules can be polymerized into polymers which also have completely conjugated sequences through the acetylenic end groups. This factor is what makes the acetylene-substituted Schiff's bases so unique.

There are several mechanisms for causing acetylene-substituted Schiff's bases to polymerize. For example, an oxidative coupling process would yield from (6)

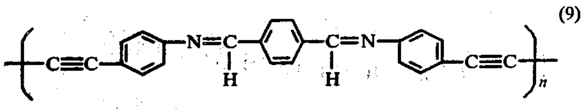
(9)

where acetylene to acetylene sequences (butadiyne groups) (—C≡C—C≡C—) are produced in the chain and n may range from 2 to about 10,000. On the other hand, a relatively low temperature thermal polymerization produces

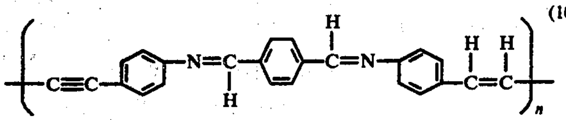
(10)

which contains the ene-yne sequence

in the chain.

Aside from the conductivity aspects, occasioned by the degree of conjugation discussed above, acetylene-terminated Schiff's bases may be polymerized at temperatures as low as 150°-160° C., depending upon the specific prepolymers, which constitutes a resin processing advantage. At 160° C. the terephthalaldehyde/m-aminophenylacetylene oligomer had such a long "pot life" that it did not reach a tacky state for 1-1¼ hours and at 170° C. it reached the tacky state in ½ hour. The capacity to exhibit long pot lives is also a great advantage in resin processing.

A detailed method for synthesizing one of the compounds of this invention is shown in the following example.

EXAMPLE 1

3-aminophenylacetylene (M.W. 117, 15.7 g, 0.13 moles) and absolute ethanol (100 ml) were placed into a 200 ml 3-necked round bottomed flask equipped with a mechanical stirrer. Terephthalaldehyde (m.w. 134, 9.0 g, 0.067 moles) was added portion-wise over 30 minutes. Additional absolute ethanol (70 ml) was added to facilitate mixing (product is insoluble in cold ethyl alcohol). The reaction mixture was allowed to stir over the weekend, then the solution was filtered and the solid product washed with EtOH. It was then re-dissolved in hot ethanol (about 2 liters) and allowed to cool. When cooled thoroughly (refrigerated) the crystalline product was collected by filtration and washed with cold ethanol. The yield was 19.9 g and the crystals were pale yellow. The product melted at 136°-139° C. Infrared analysis and nuclear magnetic resonance spectroscopy substantiated the theoretical molecular structure. For example, NMR showed the acetylene: m-phenylene: p-phenylene: =CH hydrogen ratios to be 1:4:2:1 (precisely what theory predicts). The product has the structure:

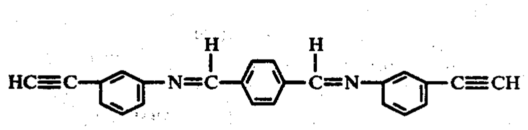

EXAMPLE II

This example serves to demonstrate that these acetylenic Schiff's bases are homopolymerizable. Samples of the product of Example 1 were heated at various temperatures above their melting points and the time required for them to polymerize to a tacky state, and then to the resin state are shown below.

| | Tacky State | Resinous State |
|---|---|---|
| @195° C. | 2-3 min. | 5 min. |
| 188° C. | 9 min. | |
| 180° C. | 23 min. | 30 min. |
| 170° C. | 30 min. | 40 min. |
| 160° C. | 60 min. | 80 min. |
| 150° C. | > 2½ hours | |

It is evident from these results that "pot life" can be extended to over 1 hour, simply by lowering the cure temperature. This is an excellent handling characteristic and makes the fabrication of composite structures easy to implement.

Having completely disclosed the nature of my invention and provided teachings to enable others to make and use the same, the scope of my claims may now be understood as follows:

What is claimed is:

1. A polymerizable acetylene terminated Schiff's base oligomer whose formula is $HC\equiv C-Ar-R-AR-C\equiv CH$ where R may be $-N=CH-Ar'-CH=N-$ or $-CH=N-Ar'-N=CH-$, Ar is phenylene, biphenylene, naphthylene, anthracene, phenanthrene, pyrene, alkyl and aryl substituted phenylene, alkyl or aryl substituted naphthylene, heterocyclic analogues of the above and wherein one or more of the aromatic carbon atoms is replaced by nitrogen, heterocyclic analogues of the above wherein one or more of the aromatic carbon atoms is replaced by sulfur or a moiety whose structure is

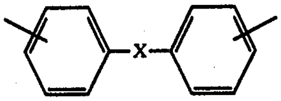

where X is O, S, $CH_2$, $-(CH_2)_n-$, $-CO-$, $-(CF_2)_n-$, $>C(CH_3)_2$, $-SO_2-$ or phenylene and Ar' is phenylene, diphenylene, terphenylene, naphthalene, anthracene, phenanthrene or a compound whose structure is $\phi-X'-\phi$ wherein $\phi$ is phenylene and X' is O, S, $CH_2$, $-(CH_2)_n-$, $-CO-$, $-(CF_2)_n-$, $>C(CH_3)_2$ or $-SO_2-$.

2. The polymerizable Schiff's base of claim 1 wherein the formula of said base is $HC\equiv C-Ar-N=CH-Ar-CH=N-Ar-C\equiv CH$.

3. The Schiff's base of claim 2 wherein Ar and Ar' are phenylene.

4. The Schiff's base of claim 3 wherein the structure of said oligomer is (7)

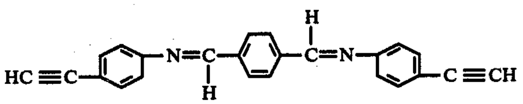

5. A fully conjugated polymeric resin whose structural formula is

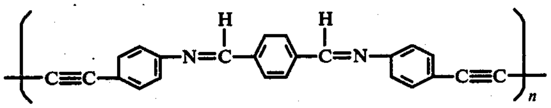

where n may be from 2 to more.

6. A polymeric resin whose structural formula is:

$$\left(C\equiv C-Ar-R-Ar-\overset{H}{C}\equiv C\right)_n$$

where R may be $-N=CH-Ar'-CH=N-$ or $-CH=N-Ar'-N=CH-$ wherein Ar may be phenylene, biphenylene, napththylene, anthracene, phenanthrene, pyrene, alkyl and aryl substituted phenylene, alkyl or aryl substituted naphthylene, heterocyclic analogues and Ar' may be phenylene, diphenylene, terphenylene, naphthalene, anthracene, or phenanthrene moieties.

* * * * *